(12) United States Patent
Jo

(10) Patent No.: US 12,110,934 B2
(45) Date of Patent: Oct. 8, 2024

(54) BRAKE APPARATUS FOR VEHICLE

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 352 days.

(21) Appl. No.: 17/736,195

(22) Filed: May 4, 2022

(65) Prior Publication Data

US 2022/0381308 A1     Dec. 1, 2022

(30) Foreign Application Priority Data

Jun. 1, 2021   (KR) .................. 10-2021-0070948

(51) Int. Cl.

| | | |
|---|---|---|
| *F16D 65/18* | (2006.01) | |
| *B60T 1/06* | (2006.01) | |
| *B60T 13/74* | (2006.01) | |
| *F16D 55/226* | (2006.01) | |
| *F16D 121/24* | (2012.01) | |
| *F16D 125/40* | (2012.01) | |
| *F16D 125/48* | (2012.01) | |
| *F16D 125/50* | (2012.01) | |

(52) U.S. Cl.
CPC ............ *F16D 65/183* (2013.01); *B60T 1/065* (2013.01); *B60T 13/746* (2013.01); *F16D 55/226* (2013.01); *F16D 2121/24* (2013.01); *F16D 2125/40* (2013.01); *F16D 2125/48* (2013.01); *F16D 2125/50* (2013.01)

(58) Field of Classification Search
None
See application file for complete search history.

(56) References Cited

U.S. PATENT DOCUMENTS

| | | | |
|---|---|---|---|
| 7,523,814 B2* | 4/2009 | Macke ................. | F16D 65/568 188/196 R |
| 7,931,129 B2* | 4/2011 | Norman ............... | F16D 65/568 188/71.9 |
| 2021/0016758 A1* | 1/2021 | Choi .................... | F16D 55/226 |

FOREIGN PATENT DOCUMENTS

KR   10-2010-0098846 A   9/2010

* cited by examiner

*Primary Examiner* — Melanie Torres Williams
(74) *Attorney, Agent, or Firm* — Novo TechIP International PLLC

(57) ABSTRACT

A brake apparatus for a vehicle may include: a housing; a pair of pressing parts installed inside the housing, and configured to receive power from a driver and press a brake pad; a load transfer part installed between the pair of pressing parts, and configured to transfer a pressing load of any one of the pair of pressing parts to the other pressing part; and a constraint part installed in the housing such that a length thereof is adjustable, and configured to selectively constrain an operation of the load transfer part depending on a protruding length thereof into the housing.

11 Claims, 7 Drawing Sheets

BRAKE APPARATUS FOR VEHICLE

CROSS-REFERENCE TO RELATED APPLICATIONS

This application claims priority from and the benefit of Korean Patent Application No. 10-2021-0070948, filed on Jun. 1, 2021, which is hereby incorporated by reference for all purposes as if set forth herein.

BACKGROUND

1. Technical Field

Exemplary embodiments of the present disclosure relate to a brake apparatus for a vehicle, and more particularly, a brake apparatus for a vehicle, which includes a pair of pistons.

2. Discussion of Related Art

In general, a brake for a vehicle includes a motor and a power transfer device for operating a friction pad installed on a caliper of a disk brake apparatus during driving and parking.

Recently, a brake for a vehicle, which presses a disk by using a pair of left and right pistons, has been applied. In this case, when non-uniform loads are transferred to the left and right pistons, braking performance may be degraded. As a method for solving such a problem, the loads of the left and right pistons may be transferred through a balancing gear. For example, when the left piston first receives a load, a right ring gear may be rotated through the balancing gear such that the load values of the right and left pistons are synchronized. Thus, the left and right pistons may be induced to press the pad with the same load.

However, when the brake is released, the piston having a smaller load is first released by the balancing action, and the piston having a higher load is then released. In many cases, the piston having a higher load may be incompletely released due to the time limit to release time. When the piston is incompletely released, a drag may be caused by a residual load.

The related art of the present disclosure is disclosed in Korean Patent Application Publication No. 10-2010-0098846 published on Sep. 10, 2010 and entitled "Disk Brake Having Parking Function".

SUMMARY

Various embodiments are directed to a brake apparatus for a vehicle, which can prevent a piston from being incompletely released, when the brake is released.

In an embodiment, a brake apparatus for a vehicle may include: a housing; a pair of pressing parts installed inside the housing, and configured to receive power from a driver and press a brake pad; a load transfer part installed between the pair of pressing parts, and configured to transfer a pressing load of any one of the pair of pressing parts to the other pressing part; and a constraint part installed in the housing such that a length thereof is adjustable, and configured to selectively constrain an operation of the load transfer part depending on a protruding length thereof into the housing.

Each of the pressing parts may include: a sun gear part rotated by the power received from the driver; a planetary gear part rotated while engaged with the sun gear part; a carrier part coupled to the planetary gear part; and a piston part connected to the carrier part, and configured to receive a rotational force from the planetary gear part and press the brake pad by being moved toward the brake pad.

The carrier part may include: a carrier body; a carrier rotating shaft protruding from the carrier body toward the planetary gear part, and coupled through the planetary gear part; and a carrier connector formed on an inner circumferential surface of the carrier body, and connected to a piston connector provided on the piston part.

The carrier connector and the piston connector may be spline-coupled to each other.

The load transfer part may include: a pair of ring gear parts each rotated while engaged with the planetary gear part; and one or more transfer gear parts disposed between the pair of ring gear parts and engaged with the ring gear parts.

The ring gear part may include: a ring gear inner part disposed outside the planetary gear part, and having an inner gear part formed along an inner circumferential surface thereof so as to be engaged with the planetary gear part; and a ring gear outer part coupled to an outer surface of the ring gear inner part, and having an outer gear part formed along an outer circumferential surface thereof so as to be engaged with the transfer gear part.

The constraint part may include: a fixed part fixed to the housing; a rotating part rotatably inserted into the fixed part; and a constraint member configured to reciprocate inside the housing in connection with a rotation of the rotating part, and interfere with a rotation of the transfer gear part by being moved a preset distance or more toward the transfer gear part.

The fixed part may be disposed inside the housing so as to be spaced by a predetermined distance from an outer circumferential surface of the transfer gear part.

The rotating part may include: a rotating member rotatably connected to the constraint member; and a support part extended from the rotating member, and configured to support the rotating member while abutting on at least one of the fixed part and the housing.

The support part may be disposed at an end of the rotating member and has a larger diameter than the rotating member.

The constraint member may include: a moving part slidably installed on the fixed part, and configured to move toward the transfer gear part as the rotating part is rotated to one side; an entry induction part disposed so as to face the transfer gear part, and having a width that decreases toward an end thereof; and a locking part provided between the entry induction part and the moving part, and locked and coupled to the transfer gear part so as to constrain the rotation of the transfer gear part.

The moving part may have a screw thread formed on an inner circumferential surface thereof and is screwed to the rotating part.

In accordance with the embodiment of the present disclosure, when a pressing load is biased to any one of the pair of pressing parts, the brake apparatus for a vehicle may transfer the pressing load to the other pressing part, such that the pair of pressing parts can press the brake pad with the same load.

Furthermore, the constraint part may constrain the operation of the load transfer part while the pressing parts are separated from the brake pad, which makes it possible to rapidly separate the pair of piston parts from the brake pad, and to prevent a drag caused by the incomplete release of the piston parts.

DETAILED DESCRIPTION

Figure 1:
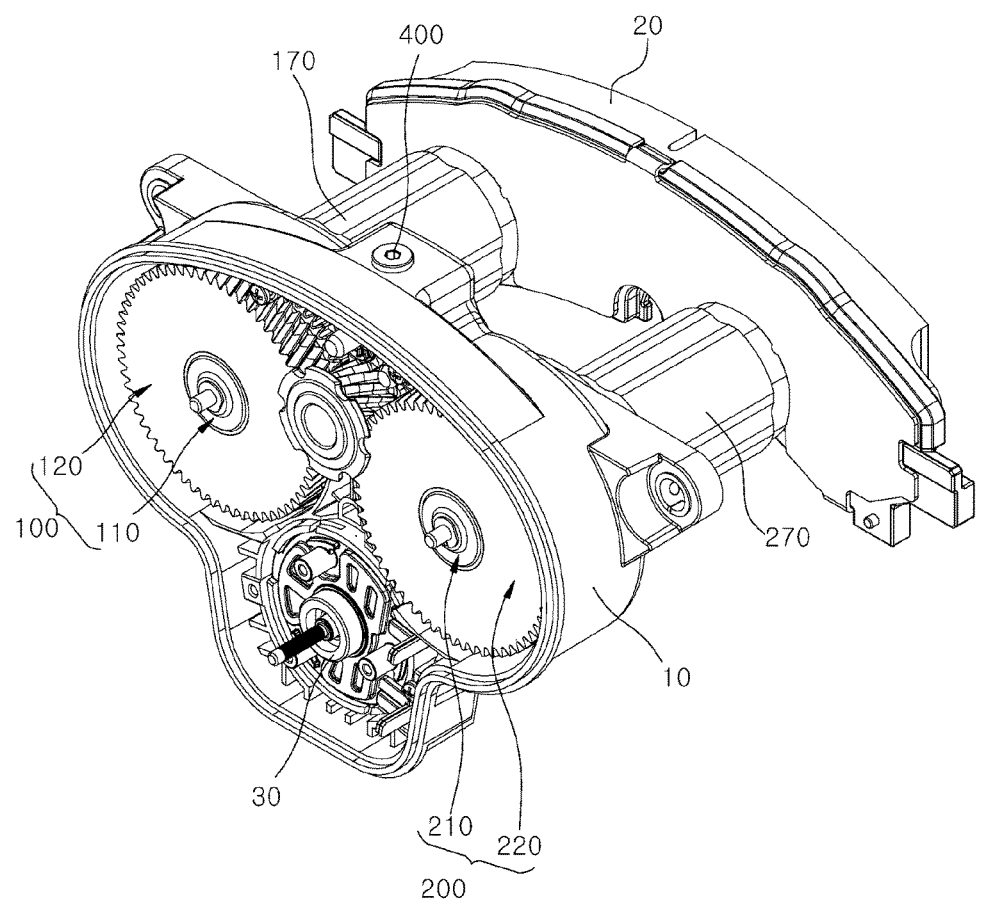
FIG. 1 is a perspective view schematically illustrating the configuration of a brake apparatus for a vehicle in accordance with an embodiment of the present disclosure.

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Throughout the specification, when one element is referred to as being "connected to" or "coupled to" another element, it may indicate that the one element is "directly connected or coupled to" the another element or the one element is "indirectly connected or coupled to" with still another element interposed therebetween. In this specification, when an element "includes or has" a component, it may indicate that the element does not exclude another component unless referred to the contrary, but can further include or have another component.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of sub components included in the drawings of this specification and the relative difference between sizes are set for convenience of description, and may not limit embodiments but may be set to various values.

Figure 2:
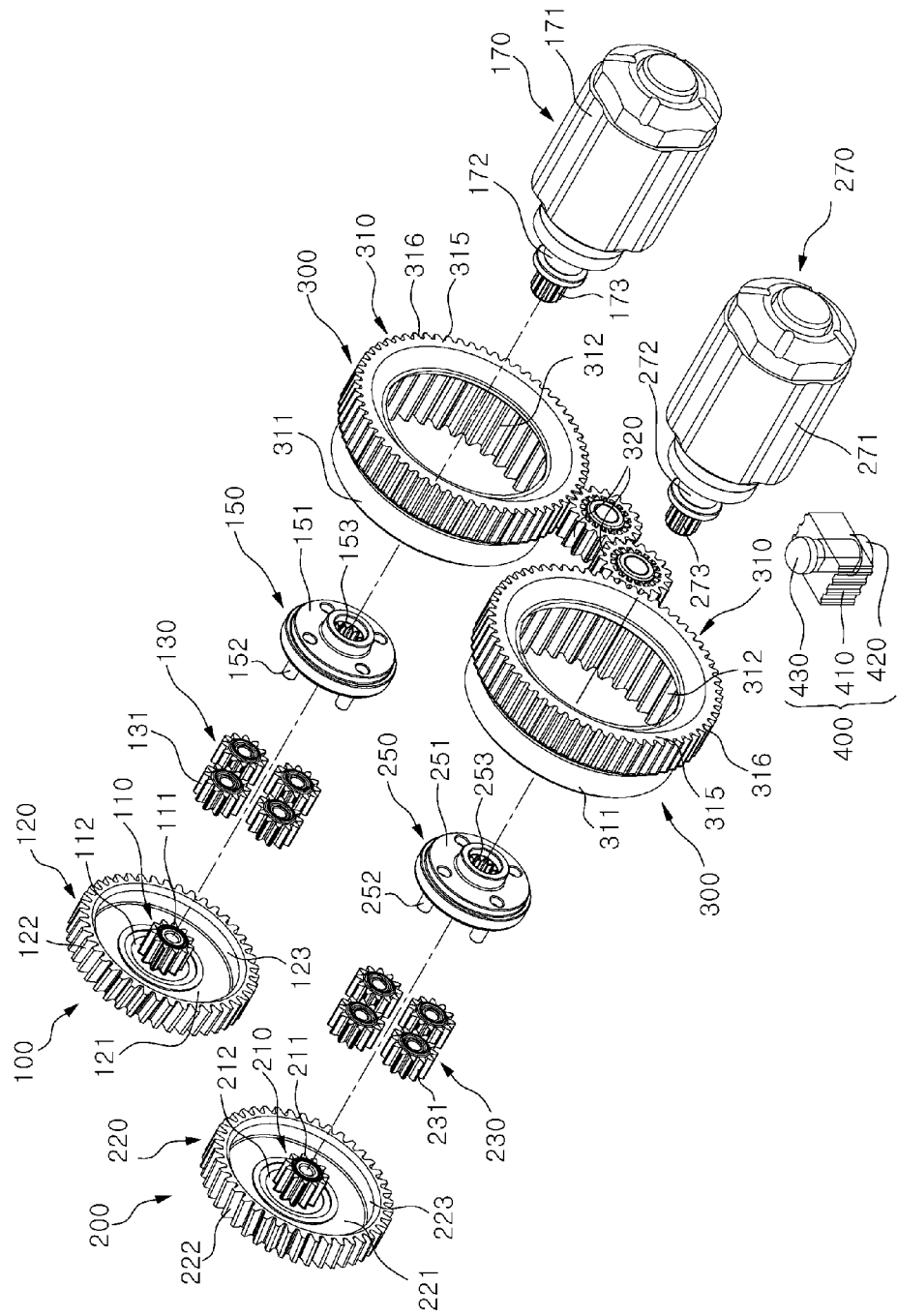
FIG. 2 is an exploded perspective view schematically illustrating the configuration of the brake apparatus for a vehicle in accordance with the embodiment of the present disclosure.
Figure 3:
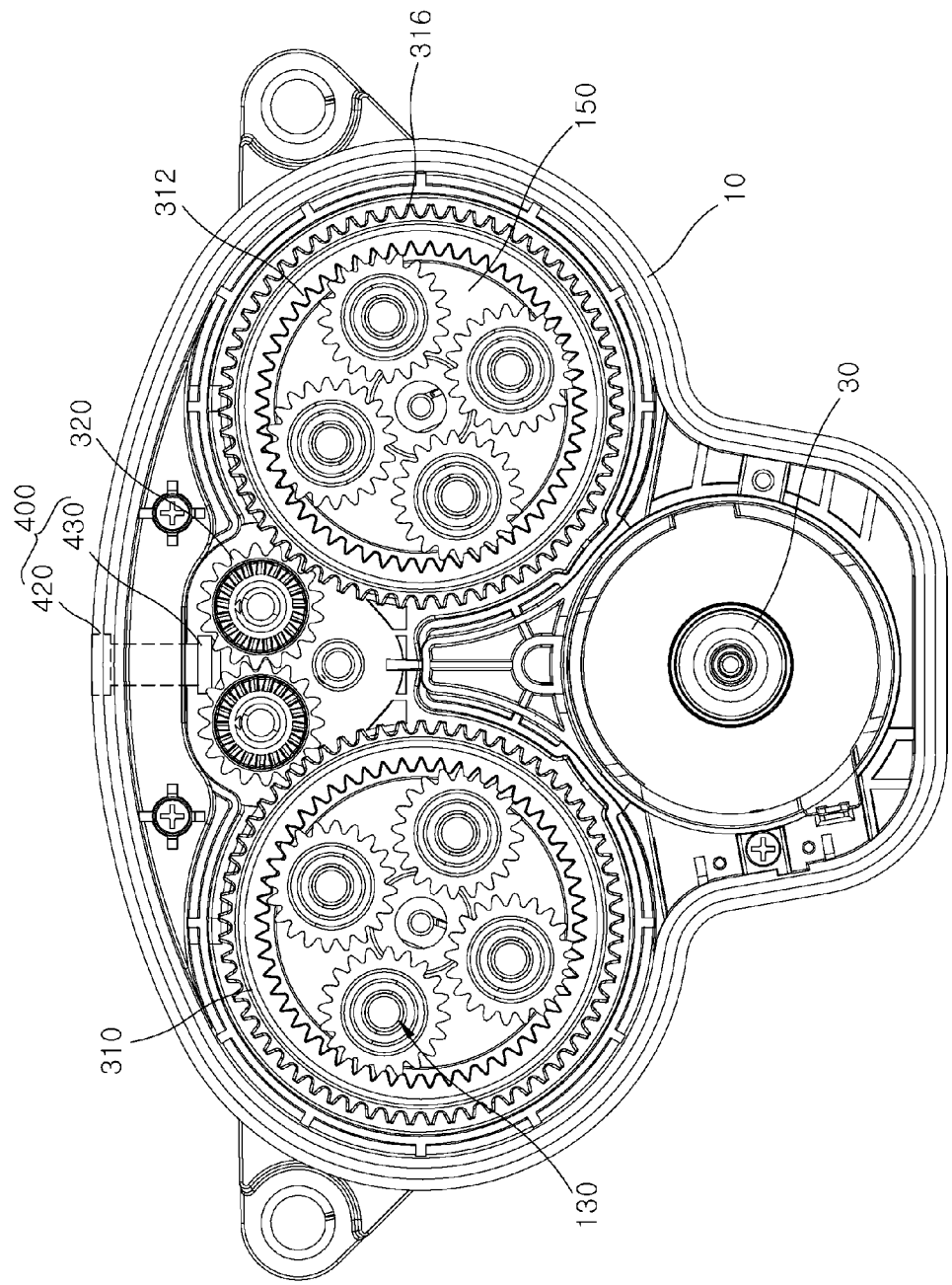
FIG. 3 is a front view schematically illustrating the configuration of the brake apparatus for a vehicle in accordance with the embodiment of the present disclosure.

FIG. 1 is a perspective view schematically illustrating the configuration of a brake apparatus for a vehicle in accordance with an embodiment of the present disclosure, FIG. 2 is an exploded perspective view schematically illustrating the configuration of the brake apparatus for a vehicle in accordance with the embodiment of the present disclosure, and FIG. 3 is a front view schematically illustrating the configuration of the brake apparatus for a vehicle in accordance with the embodiment of the present disclosure.

Referring to FIGS. 1 to 3, a brake apparatus 1 in accordance with an embodiment of the present disclosure includes a housing 10, a pressing part 100 and 200, a load transfer part 300, and a constraint part 400.

The housing 10 has an internal space in which the pressing part 100 and 200, the load transfer part 300, and the constraint part 400 can be installed. The housing 10 may be opened/closed so that the components installed therein can be easily replaced and managed. The specific shape of the housing 10 is not limited to that illustrated in FIG. 1, but may be variously changed in design depending on the shapes and sizes of the pressing part 100 and 200, the load transfer part 300, and the constraint part 400.

The pressing part 100 and 200 is positioned within the housing 10, receives power from a driver 30, and presses a brake pad 20 to cause contact friction with a disk (not illustrated).

The driver 30 includes an electric motor configured to receive electric power from the outside and generate power, and a driving gear connected to an output shaft of the electric motor and rotated by the electric motor. The driving gear in accordance with the embodiment of the present disclosure may be variously changed in design, as long as the driving gear can transfer a rotational force of the electric motor to the pressing part 100 and 200. For example, the driving gear may be implemented as a worm gear.

The pressing part 100 and 200 is provided as a plurality of pressing parts, and the plurality of pressing parts 100 and 200 are arranged in parallel to each other. The pressing parts 100 and 200 are symmetrically installed on the left and right sides (based on FIG. 3) on the basis of the central portion of the brake pad 20.

The pressing parts 100 and 200 receive power from the driver 30, and press the brake pad 20 with the same pressing load. Such a pressing force moves the brake pad 20 toward the disk, and the friction between the brake pad 20 and the disk generates a braking force.

The pressing part 100 and 200 in accordance with the embodiment of the present disclosure includes a sun gear part 110 and 210, a connection gear part 120 and 220, a planetary gear part 130 and 230, a carrier part 150 and 250, and a piston part 170 and 270.

The connection gear part 120 and 220 in accordance with the embodiment of the present disclosure includes a connection gear body 121 and 221, a connection wheel 122 and 222, and a connection insertion part 123 and 223.

The connection gear body 121 and 221 forms the approximate exterior of the connection gear part 120 and 220. The connection gear body 121 and 221 in accordance with the embodiment of the present disclosure may be formed in substantially a disk shape.

The connection wheel 122 and 222 is formed on the outer circumferential surface of the connection gear body 121 and 221. The connection wheel 122 and 222 in accordance with the embodiment of the present disclosure may have gear teeth which are continuously extended along the outer circumferential surface of the connection gear body 121 and 221. The connection wheel 122 and 222 is engaged and coupled with the driver 30 or specifically the driving gear. Thus, the power of the driver 30 may be transferred to the connection gear part 120 and 220, and rotate the connection gear part 120 and 220.

The connection insertion part 123 and 223 is formed in the internal space of the connection wheel 122 and 222. That is, the connection wheel 122 and 222 is formed outside a wall formed along the outer circumferential surface of the connection gear body 121 and 221, and the connection insertion part 123 and 223 is formed in the internal space of the wall on which the connection wheel 122 and 222 is formed. The connection insertion part 123 and 223 in accordance with the embodiment of the present disclosure is formed in the shape of a concave groove. A ring gear part 310 to be described below or specifically a ring gear inner part 311 is inserted into the connection insertion part 123 and 223.

The sun gear part 110 and 210 is rotated by power received from the driver 30. In accordance with the present embodiment, the sun gear part 110 and 210 is coupled to the connection gear part 120 and 220, and can be rotated through the connection gear part 120 and 220 receiving power from the driver 30.

The sun gear part 110 and 210 forms a concentric circle with the rotation center of the connection gear part 120 and 220. Therefore, when power is transferred to the connection gear part 120 and 220 by a power transfer part 70, the connection gear part 120 and 220 and the sun gear part 110 and 210 are rotated on the same rotation axis.

The sun gear part 110 and 210 is disposed within the inner circumferential surface of the connection gear part 120 and 220 having the connection insertion part 123 and 223 formed therein.

The sun gear part 110 and 210 may be formed as one body with the connection gear part 120 and 220. Alternatively, the sun gear part 110 and 210 may be formed separately from the connection gear part 120 and 220, and integrated with the connection gear part 120 and 220 through coupling.

Since the sun gear part 110 and 210 is formed as one body with the connection gear part 120 and 220 or integrated with the connection gear part 120 and 220, the sun gear part 110 and 210 is rotated with the connection gear part 120 and 220, when the connection gear part 120 and 220 driven by the power received from the power transfer part 70 is rotated.

The sun gear part 110 and 210 in accordance with the embodiment of the present disclosure includes a sun gear 111 and 211 and a sun gear connection body 112 and 212.

The sun gear connection body 112 and 212 is coupled to the connection gear body 121 and 221. The sun gear 111 and 211 is formed in the center of the sun gear connection body 112 and 212, and has gear teeth formed on the outer circumferential surface thereof so as to be engaged with the planetary gear part 130 and 230.

The sun gear 111 and 211 is disposed within the planetary gear part 130 and 230 provided as a plurality of planetary gear parts. The planetary gear part 130 and 230 rotates and revolves while engaged with the sun gear 111 and 211.

The planetary gear part 130 and 230 includes a plurality of planetary gears 131 and 231. In the present embodiment, four planetary gears 131 and 231 are exemplified. However, the present disclosure is not limited thereto, but the number of the planetary gears may be set to three or less or five or more.

The plurality of planetary gears 131 and 231 are arranged at equal angles on the basis of the rotation center of the sun gear 111 and 211. When the sun gear 111 and 211 is rotated, the plurality of planetary gears 131 and 231 rotate and/or revolve while engaged with the sun gear 111 and 211.

The planetary gear part 130 and 230 is coupled to the carrier part 150 and 250. When the plurality of planetary gears 131 and 231 revolve around the sun gear 111 and 211, the carrier part 150 and 250 is also rotated in the clockwise direction or the counterclockwise direction.

As the carrier part 150 and 250 is rotated, the piston part 170 and 270 is moved toward the brake pad 20, and presses the brake pad 20.

The carrier part 150 and 250 in accordance with the embodiment of the present disclosure includes a carrier body 151 and 251, a carrier rotating shaft 152 and 252, and a carrier connector 153 and 253.

The carrier rotating shaft 152 and 252 protrudes from the carrier body 151 and 251 toward the planetary gear part 130 and 230.

The carrier rotating shaft 152 and 252 is provided as a plurality of carrier rotating shafts which correspond to the number of the planetary gear parts 130 and 230, and extend through the planetary gear parts 130 and 230. Thus, the planetary gear part 130 and 230 may rotate on the central axis thereof, while rotated on the carrier rotating shaft 152 and 252.

The carrier connector 153 and 253 is formed on the inner circumferential surface of the carrier body 151 and 251, and connected to a piston connector 173 and 273 of the piston part 170 and 270.

In the present disclosure, the carrier connector 153 and 253 is formed in a concave groove shape, and the piston connector 173 and 273 is formed in the shape of a protrusion inserted into the carrier connector 153 and 253.

On the contrary, the piston connector 173 and 273 may be formed in a concave groove shape, and the carrier connector 153 and 253 may be formed in the shape of a protrusion inserted into the piston connector 173 and 273.

The carrier connector 153 and 253 and the piston connector 173 and 273 may be spline-coupled to each other. The carrier part 150 and 250 and the piston part 170 and 270 may be coupled through a different method from spline coupling, for example, a screw coupling method.

The piston part 170 and 270 is connected to the carrier part 150 and 250. As the carrier part 150 and 250 is rotated, the piston part 170 and 270 is rotated together. The piston part 170 and 270 is moved toward the brake pad 20 by a rotational force received from the planetary gear part 130 and 230, and presses the brake pad 20.

The piston part 170 and 270 in accordance with the embodiment of the present disclosure includes a piston body 171 and 271, a piston shaft 172 and 272, and the piston connector 173 and 273.

The piston body 171 and 271 is formed in a hollow shape, and moved so as to come into contact with the brake pad 20. The piston body 171 and 271 may be formed in a cylindrical shape.

The piston body 171 and 271 is coupled to the piston shaft 172 and 272, and the piston connector 173 and 273 is formed at an end of the piston shaft 172 and 272, facing the carrier part 150 and 250.

When the carrier part 150 and 250 is rotated, the piston connector 173 and 273 spline-coupled to the carrier connector 153 and 253 is rotated to convert the rotational motion of the carrier part 150 and 250 into a linear motion of the piston part 170 and 270.

The piston part 170 and 270 is linearly moved toward the brake pad 20. Therefore, as the piston part 170 and 270 comes into contact with the brake pad 20 and presses the brake pad 20, a braking force is generated by the friction between the brake pad 20 and the disk.

The load transfer part 300 is connected to the pair of pressing parts 100 and 200, and transfers a pressing load of any one of the pressing parts 100 and 200 to the other one.

The load transfer part 300 in accordance with the embodiment of the present disclosure includes a pair of ring gear parts 310. The load transfer part 300 may further include one or more transfer gear parts 320.

The pair of ring gear parts 310 can be rotated while the inner circumferential surfaces thereof are engaged with the planetary gear parts 130 and 230. The outer circumferential surfaces of the pair of ring gear parts 310 may be indirectly engaged with each other through the one or more transfer gear parts 320. That is, the transfer gear part 320 may be disposed between the pair of ring gear parts 310 and engaged with the ring gear parts 310. The ring gear parts 310 may be each installed between the planetary gears 131 and 231 and the connection wheel 122 and 222.

The ring gear part 310 in accordance with the embodiment of the present disclosure includes the ring gear inner part 311 and a ring gear outer part 315.

The ring gear inner part 311 may be disposed outside the planetary gear part 130 and 230, and have an inner gear part 312 formed along the inner circumferential surface thereof so as to be engaged with the planetary gear part 130 and 230.

The inner gear part 312 of the ring gear inner part 311 installed on one side (left side in FIG. 3) is rotated in the clockwise direction or the counterclockwise direction while engaged with the planetary gear part 130, and transfers power to the ring gear part 310 disposed on the other side through the transfer gear part 320 or specifically the ring gear outer part 315.

The ring gear outer part 315 is coupled to the outer surface of the ring gear inner part 311, and has an outer gear part 316 formed along the outer circumferential surface thereof so as to be engaged with the transfer gear part 320. The ring gear outer part 315 may be formed as one body with the ring gear inner part 311.

As the inner gear part 312 of the ring gear inner part 311 installed on the one side (left side in FIG. 3) is rotated while engaged with the planetary gear part 130, the ring gear outer part 315 formed as one body with the ring gear inner part 311 is rotated in the same direction.

Therefore, the rotational force of the ring gear outer part 315 installed on the one side is transferred to the ring gear part 310 installed on the other side (right side in FIG. 5) or specifically the ring gear outer part 315 through the transfer gear part 320.

The transfer gear part 320 is rotated while engaged with the ring gear part 310 or specifically the outer gear part 316 formed on the ring gear outer part 315, and transfers the rotational force of the ring gear part 310 disposed on the one side to the ring gear part 310 disposed on the other side.

The rotational force transferred to the ring gear part 310 disposed on the other side is transferred to the carrier part 250 coupled to the planetary gears 231 through the ring gear inner part 311 and the planetary gears 231. As the carrier part 250 coupled to the planetary gears 231 is rotated while the planetary gears 231 rotate and revolve along the outer circumferential surface of the sun gear 211, the piston part 270 is moved toward the brake pad 20.

When a pressing load for pressing the brake pad 20 is not uniformly applied to the pair of pressing parts 100 and 200 or specifically the pair of piston parts 170 and 270, the load transfer part 300 may transfer the pressing load of the piston part 170 disposed on the one side to the piston part 270 disposed on the other side, such that the pair of piston parts 170 and 270 are brought into contact with the brake pad 20 by the uniform pressing load.

On the contrary, the pressing load of the piston part 270 disposed on the other side may be transferred to the piston part 170 disposed on the one side.

The transfer gear part 320 in accordance with the embodiment of the present disclosure is formed in the shape of a spur gear, and rotated while engaged with the outer gear part 316 formed along the outer circumferential surface of the ring gear outer part 315. In additional to the spur gear, however, the shape of the transfer gear part 320 may be replaced with various gear shapes such as a bevel gear shape and a helical gear shape having gear teeth inclined at a predetermined angle with respect to the rotation center axis of the transfer gear part 320.

In the present embodiment, it has been exemplified that the transfer gear part 320 is formed in a gear shape. However, the present disclosure is not limited thereto, but the transfer gear part 320 may be modified in various manners. For example, the transfer gear part 320 may be formed in a belt shape and connected to the pair of ring gear parts 310, and transfer power of the pressing part 100 on the one side to the pressing part 200 on the other side.

The load transfer part 300 may be provided as a plurality of load transfer parts. Therefore, the number of the load transfer parts 300 is not limited to two as in the present embodiment, but the load transfer part 300 may be modified in various manners. For example, one or three or more load transfer parts may be provided depending on the distance between the pair of pressing parts 100 and 200.

The constraint part 400 is inserted through the housing 10, and installed in the housing 10 such that the length thereof can be adjusted. The constraint part 400 selectively constrains the operation of the load transfer part 300 depending on the protruding length thereof into the housing 10. That is, when the operation of the load transfer part 300 is not needed, a user may manipulate the constraint part 400 to interfere with the load transfer part 300, such that the constraint part 400 constrains the load transfer operation between the pair of pressing parts 100 and 200 through the load transfer part 300. Thus, the constraint part 400 may induce the pair of pressing parts 100 and 200 to rapidly separate from the brake pad 20 during the process of removing the braking force provided to the disk, which makes it possible to prevent a drag caused by the generation of a residual load.

Figure 4:
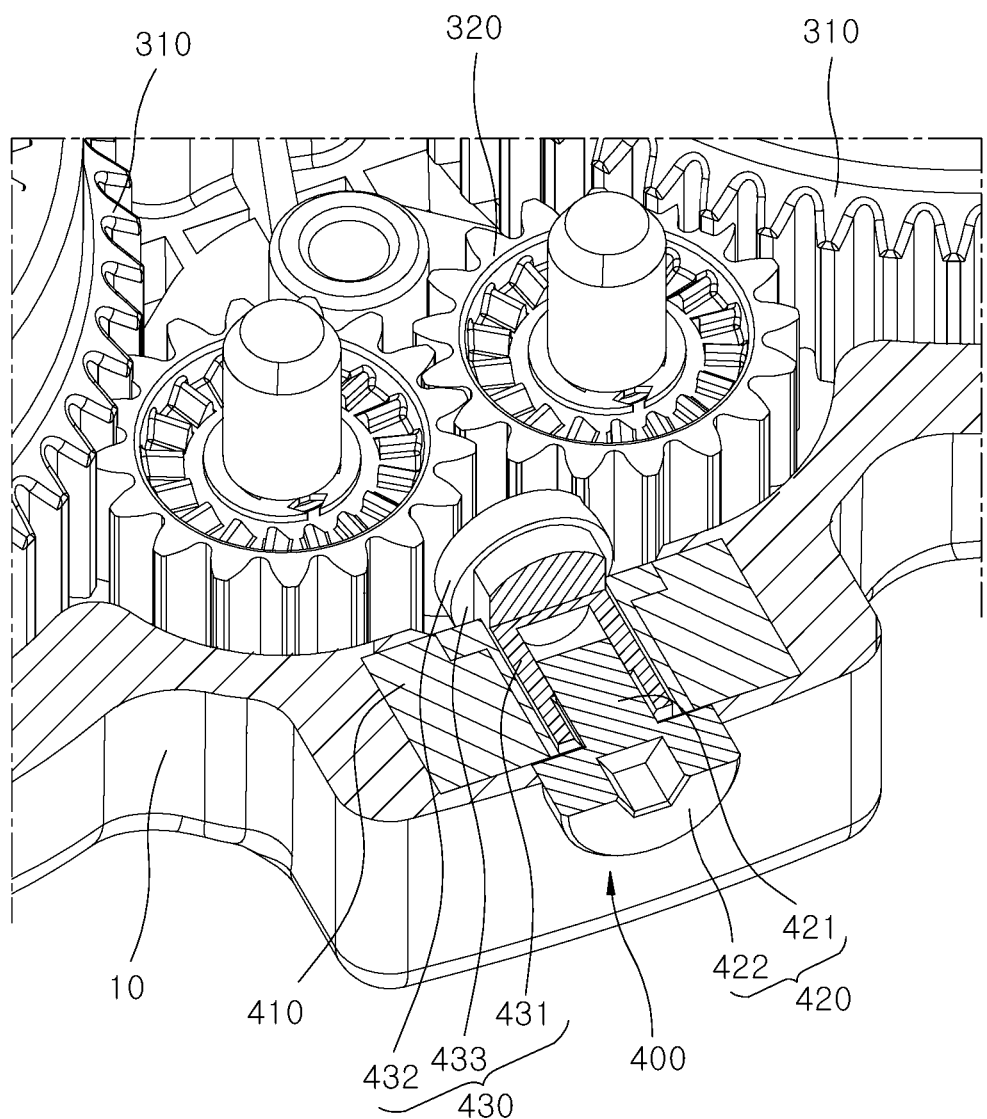
FIG. 4 is a perspective view schematically illustrating the configuration of a constraint part in accordance with the embodiment of the present disclosure.
Figure 5:
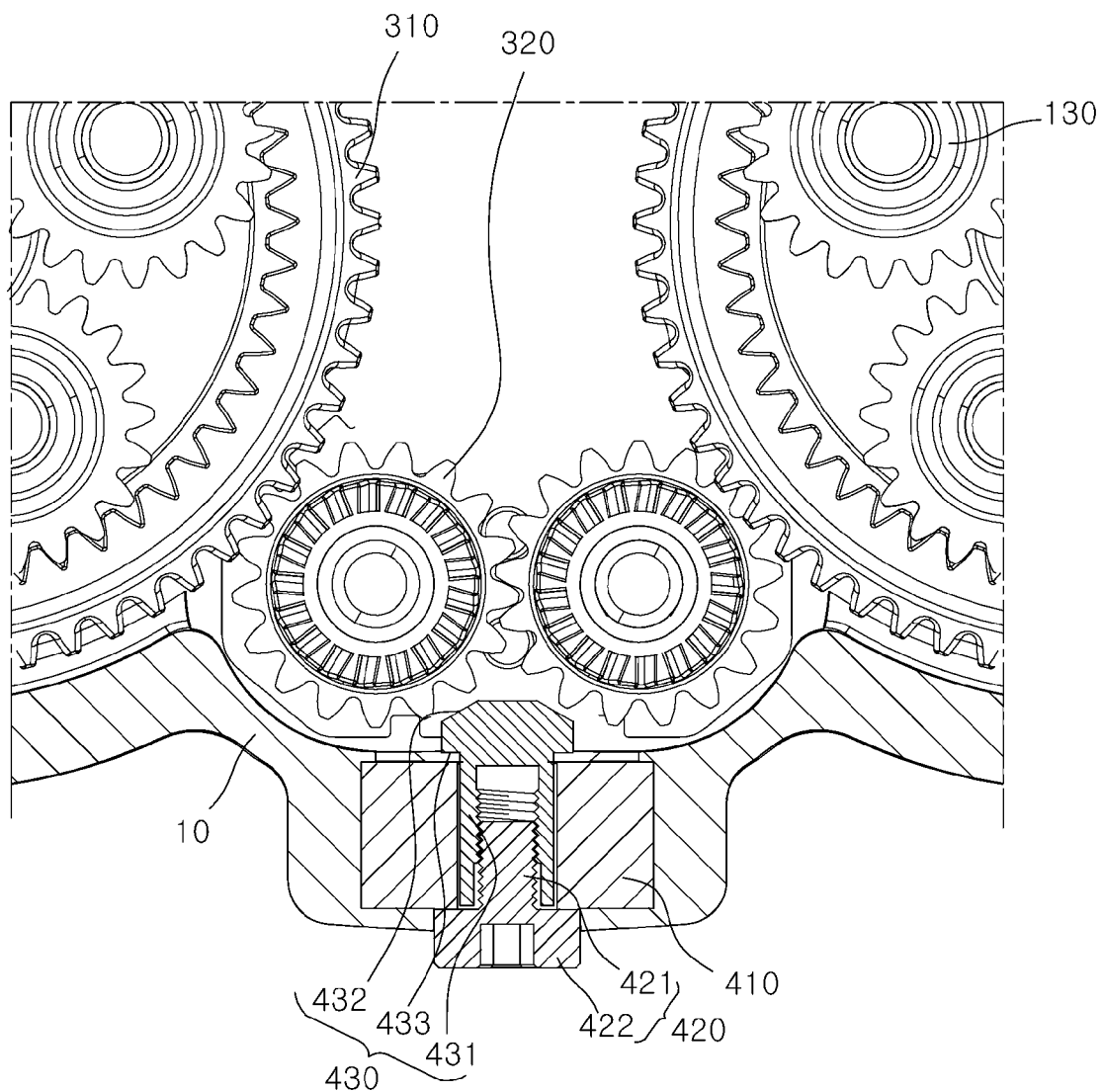
FIG. 5 is a front view schematically illustrating the configuration of the constraint part in accordance with the embodiment of the present disclosure.

FIG. 4 is a perspective view schematically illustrating the configuration of the constraint part in accordance with the embodiment of the present disclosure, and FIG. 5 is a front view schematically illustrating the configuration of the constraint part in accordance with the embodiment of the present disclosure.

Referring to FIGS. 4 and 5, the constraint part 400 in accordance with the embodiment of the present disclosure includes a fixed part 410, a rotating part 420, and a constraint member 430.

The fixed part 410 is fixed to the housing 10, and not only rotatably supports the rotating part 420 which will be described below, but also slidably supports the constraint member 430 which will be described below. The fixed part 410 in accordance with the embodiment of the present disclosure is fixed to the inner surface of the housing 10 through welding, bolting or the like. The fixed part 410 is disposed within the housing 10 so as to be spaced part by a predetermined distance from the outer circumferential surface of the transfer gear part 320. The fixed part 410 has a through-hole into which the rotating part 420 and the constraint member 430, which will be described below, can be inserted. The through-hole is formed so that both sides thereof communicate with the inside and outside of the housing 10, respectively.

The rotating part 420 is rotatably inserted into the fixed part 410. The rotating part 420 reciprocates the constraint member 430 within the housing 10 depending on the rotation direction thereof. The rotating part 420 in accordance with the embodiment of the present disclosure includes a rotating member 421 and a support part 422.

The rotating member 421 is inserted into the fixed part 410, and rotatably connected to the constraint member 430. The rotating member 421 in accordance with the embodiment of the present disclosure is formed in substantially a rod shape, and inserted into the through-hole formed in the fixed part 410 through the outer surface of the housing 10. The rotating member 421 may have a smaller diameter than the through-hole formed in the fixed part 410 and thus provide the space in which the constraint member 430 to be described below is inserted into the fixed part 410. The rotating member 421 has a screw thread formed on the outer circumferential surface thereof and extended helically in the longitudinal direction of the rotating member 421.

The support part 422 is extended from the rotating member 421, and abuts on at least one of the fixed part 410 and the housing 10 and supports the rotating member 421. The support part 422 in accordance with the embodiment of the present disclosure is formed in substantially a disk shape, and disposed at an end of the rotating member 421 extended toward the outside of the housing 10. The support part 422 has a larger diameter than the rotating member 421. The support part 422 is supported by the fixed part while the inner surface thereof abuts on the outer surface of the fixed part 410 and the circumferential surface thereof abuts on the inner circumferential surface of the housing 10 communicating with the through-hole of the fixed part 410. The support part 422 may support the rotating member 421 to rotate while maintaining a regular position without moving in an axial direction or radial direction, and prevent the rotating member 421 from separating from the fixed part 410. The support part 422 may have a tool groove formed on the outer surface thereof such that an operation tool such as a wrench or driver can be connected to the tool groove. So far, it has been described as an example that the support part 422 abuts on both of the fixed part 410 and the housing 10. However, the support part 422 may abut on any one of the fixed part 410 and the housing 10.

The constraint member 430 reciprocates within the housing 10 in connection with the rotation of the rotating part 420. More specifically, the constraint member 430 is moved toward the transfer gear part 320 when the rotating part 420 is rotated to one side, and is moved away from the transfer gear part 320 when the rotating part 420 is rotated to the other side. As the constraint member 430 is moved by a predetermined distance or more toward the transfer gear part 320, the constraint member 430 interferences with the transfer gear part 320, and constrains the rotation of the transfer gear part 320.

The constraint member 430 in accordance with the embodiment of the present disclosure includes a moving part 431, an entry induction part 432, and a locking part 433.

The moving part 431 forms the lower exterior of the constraint member 430, and is slidably installed on the fixed part 410. The moving part 431 is connected to the rotating part 420, and moved toward the transfer gear part 320 as the rotating part 420 is rotated to the one side. The moving part 431 in accordance with the embodiment of the present disclosure is formed in a hollow rod shape whose bottom is open, and the open side of the moving part 431 is inserted between the outer circumferential surface of the rotating member 421 and the inner circumferential surface of the through-hole formed in the fixed part 410. The outer circumferential surface of the moving part 431 comes into slidable contact with the inner circumferential surface of the through-hole formed in the fixed part 410. The moving part 431 has a screw thread formed on the inner circumferential surface thereof, and is screw-coupled to a screw thread formed on the outer circumferential surface of the rotating member 421.

The entry induction part 432 forms the upper exterior of the constraint member 430. The entry induction part 432 has one side facing the transfer gear part 320, and has a width that decreases toward an end thereof. The entry induction part 432 in accordance with the embodiment of the present disclosure is disposed at an upper end of the moving part 431, and has a top surface facing the transfer gear part 320. The entry induction part 432 may be formed in the shape of a spherical surface that convexly protrudes at a predetermined curvature toward the transfer gear part 320. As the moving part 431 is moved by a predetermined distance or more toward the transfer gear part 320, the entry induction part 432 enters between the pair of transfer gear part 320. In this case, since the width of the upper end of the entry induction part 432 is smaller than the width of the lower end thereof, the constraint member 430 may be inserted into the pair of transfer gear parts 320 without any interference. Furthermore, the entry induction part 432 may induce the constraint member 430 to be inserted more deeply between the pair of transfer gear parts 320. Thus, the locking part 433 which will be described below may be easily located at a position where the locking part 433 can be locked and coupled to the transfer gear part 320.

The locking part 433 is provided between the moving part 431 and the entry induction part 432. As the moving part 431 is moved by a predetermined distance or more toward the transfer gear part 320, the locking part 433 is locked and coupled to the transfer gear part 320, and constraints the rotation of the transfer gear part 320. The locking part 433 in accordance with the embodiment of the present disclosure may be disposed on the bottom surface of the entry induction part 432, and formed in the shape of a stepped portion extended in a direction perpendicular to the axial direction of the moving part 431. The locking part 433 abuts on the teeth formed on the outer circumferential surface of the transfer gear part 320 after the entry induction part 432 is inserted between the pair of transfer gear parts 320, and constrains the rotation of the transfer gear part 320.

Hereafter, the operation principle of the brake apparatus 1 for a vehicle, which is configured as described above, will be described.

Figure 6:
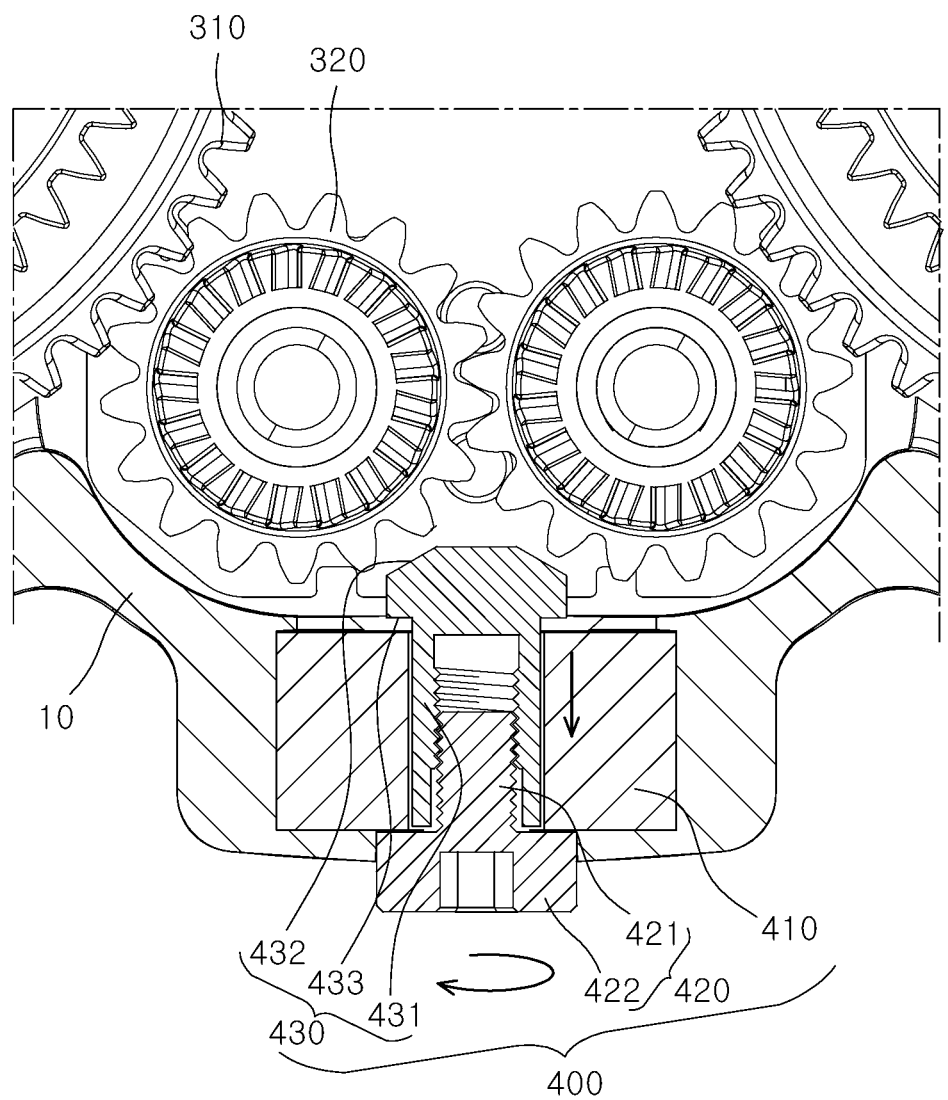
FIGS. 6 and 7 are operation diagrams schematically illustrating an operation process of the brake apparatus for a vehicle in accordance with the embodiment of the present disclosure.
Figure 7:
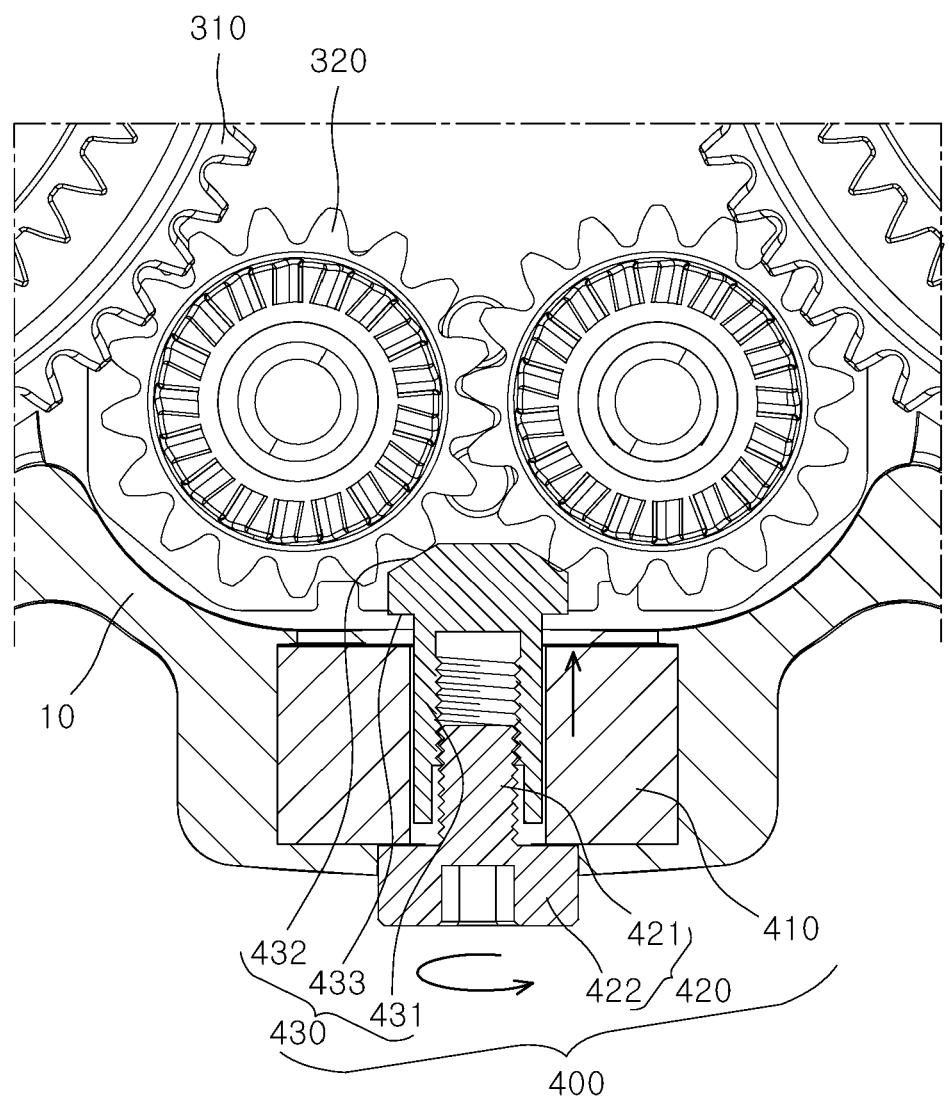

FIGS. 6 and 7 are operation diagrams schematically illustrating an operation process of the brake apparatus for a vehicle in accordance with the embodiment of the present disclosure.

Referring to FIGS. 6 and 7, the constraint part 400 is rotated to the other side (in the counterclockwise direction in FIG. 6) such that the constraint member 430 is separated from the transfer gear part 320, during an assembly process of the brake apparatus 1 for a vehicle in accordance with the embodiment of the present disclosure or before the vehicle is operated.

Thus, the transfer gear part 320 of the load transfer part 300 is maintained in a freely rotatable state.

Then, the pair of piston parts 170 and 270 are moved toward the brake pad 20 in order to press the brake pad 20.

Specifically, when the electric motor generates power by using electric power received from the outside, the connection gear part 120 and 220 connected to the output shaft of the electric motor through the driving gear is rotated.

The sun gear part 110 and 210 is rotated in connection with the rotation of the connection gear part 120 and 220, and the planetary gears 131 and 231 engaged with the sun gear 111 and 211 rotate on the central axes thereof and simultaneously revolve along the circumference of the sun gear 111 and 211.

While the planetary gears 131 and 231 revolve, the carrier part 150 and 250 coupled to the planetary gears 131 and 231 is rotated in the clockwise direction or the counterclockwise direction. As the carrier part 150 and 250 is rotated, the piston part 170 and 270 coupled to the carrier part 150 and 250 is moved toward the brake pad 20 and presses the brake pad 20.

Due to various factors, power provided by the driver 30 may be non-uniformly transferred to the pair of pressing parts 100 and 200. Specifically, a larger amount of power may be transferred to any one of the pair of pressing parts 100 and 200.

When the amount of power transferred to the pressing part 100 disposed on the one side (left side in FIG. 6) is larger than the amount of power transferred to the pressing part 200 disposed on the other side (right side in FIG. 6) during the operation of the brake apparatus 1 for a vehicle, the piston part 170 disposed on the one side may be brought into contact with the brake pad 20 before the piston part 270 disposed on the other side.

When the piston part 270 disposed on the other side is not yet brought into contact with the brake pad 20 while the piston part 170 disposed on the one side is already brought into contact with the brake pad 20, the planetary gear part 130 of the pressing part 100 disposed on the one side only rotates on the central axis thereof. That is, the planetary gear part 130 does not revolve.

Since the power generated by the operation of the driver 30 is continuously transferred to the sun gear 111, the sun gear 111 is continuously rotated. At this time, since the piston part 170 has been already brought into contact with the brake pad 20, the plurality of planetary gears 131 engaged with the sun gear 111 do not revolve, but only rotate.

Since the pressing part 100 disposed on the left side or specifically the piston part 170 cannot move toward the brake pad 20 any more, the planetary gears 131 only rotate on the central axes thereof due to a reaction force, and the ring gear inner part 311 having the inner gear part 312 engaged with the planetary gears 131 is rotated in the clockwise or counterclockwise direction.

The reaction force generated by the pressing part 100 disposed on the one side (left side in FIG. 6) through the ring gear outer part 315 coupled to the ring gear inner part 311 is transferred to the pressing part 200 disposed on the other side (right side in FIG. 6) through the transfer gear part 320.

Specifically, the power which has been provided to the pressing part 100 disposed on the one side through the outer gear part 316, the inner gear part 312 of the ring gear inner part 311, the planetary gear part 230, and the carrier part 250 coupled to the planetary gear part 230, which are disposed on the other side, is transferred to the piston part 270 disposed on the other side.

Therefore, the power provided by the driver 30 is provided to the other piston part 270 which is disposed on the other side and is not yet brought into contact with the brake pad 20, such that the linear movement of the piston part 170, which is disposed on the one side and has been already contacted with the brake pad 20, is stopped until the piston part 270 disposed on the other side is brought into contact with the brake pad 20.

Then, when the piston part 170 disposed on the one side and the piston part 270 disposed on the other side are both brought into contact with the brake pad 20, the brake pad 20 is pressed by the piston part 170 disposed on the one side and the piston part 270 disposed on the other side with the same load, while the power of the driver 30 is provided to the piston part 170 disposed on the one side and the piston part 270 disposed on the other side.

After the load transfer between the pair of pressing parts 100 and 200 is adjusted by the load transfer part 300 as described above, the operation of the load transfer part 300 is constrained by the constraint part 400.

First, the rotating part 420 is rotated to one side (in the clockwise direction in FIG. 7).

As the rotating part 420 is rotated to the one side, the moving part 431 screwed to the outer circumferential surface of the rotating member 421 is moved within the housing 10 toward the transfer gear part 320.

In this case, as the support part 422 is brought into contact with the housing 10 and the fixed part 410, the rotating member 421 may not be moved in the axial direction or radial direction, but rotated at a regular position.

As the moving part 431 is moved toward the transfer gear part 320, the entry induction part 432 enters between the pair of transfer gear parts 320.

In this case, since the entry induction part 432 has a width that decreases toward the end thereof, the entry induction part 432 may smoothly enter between the pair of transfer gear parts 320 without any interference.

When the moving part 431 is moved by a preset distance or more toward the transfer gear part 320, the locking part 433 abuts on the teeth formed on the outer circumferential surface of the transfer gear part 320, and constrains the rotation of the transfer gear part 320.

While the pair of pressing parts 100 and 200 are separated from the brake pad 20 or the braking force is removed as the transfer gear part 320 is not rotated, the pair of piston parts 170 and 270 may be rapidly separated from the brake pad 20.

Furthermore, while the pair of pressing parts 100 and 200 are brought into contact with the brake pad 20 or the braking force is applied, the pair of piston parts 170 and 270 whose pressing loads are adjusted in advance may be brought into contact with the brake pad 20 at the same time.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
   a housing;
   a pair of pressing parts positioned within the housing and configured to receive power from a driver and press a brake pad;
   a load transfer part positioned within the housing, coupled between the pair of pressing parts and configured to transfer a pressing load of any one of the pair of pressing parts to the other; and
   a constraint part coupled to the housing and configured to protrude from the housing toward the load transfer part,
   wherein a protruding length of the constraint part is adjustable, and an operation of the load transfer part is selectively constrained depending on the protruding length of the constraint part toward the load transfer part,
   wherein each of the pressing parts comprises:
   a sun gear part configured to rotate in response to the power received from the driver;

a planetary gear part configured to rotate when engaged with the sun gear part;
a carrier part coupled to the planetary gear part; and
a piston part coupled to the carrier part and configured to move toward and press the brake pad in response to a rotational force from the planetary gear part.

2. The brake apparatus of claim 1, wherein the carrier part comprises:
a carrier body;
a carrier rotating shaft protruding from the carrier body toward the planetary gear part and extending through the planetary gear part; and
a carrier connector positioned on an inner circumferential surface of the carrier body and coupled to a piston connector positioned on the piston part.

3. The brake apparatus of claim 2, wherein the carrier connector and the piston connector are spline-coupled to each other.

4. The brake apparatus of claim 1, wherein the load transfer part comprises:
a pair of ring gear parts each configured to rotate when engaged with the planetary gear part; and
one or more transfer gear parts disposed between the pair of ring gear parts and engaged with the ring gear parts.

5. The brake apparatus of claim 4, wherein each of the pair of ring gear parts comprises:
a ring gear inner part disposed outside the planetary gear part and having an inner gear part formed along an inner circumferential surface of the ring gear inner part and engaged with the planetary gear part; and
a ring gear outer part coupled to an outer surface of the ring gear inner part and having an outer gear part formed along an outer circumferential surface of the ring gear outer part and engaged with one of the one or more transfer gear parts.

6. The brake apparatus of claim 4, wherein the constraint part comprises:
a fixed part coupled to the housing;
a rotating part positioned within the fixed part; and
a constraint member configured to reciprocate within the housing in response to a rotation of the rotating part and move toward the one or more transfer gear parts for at least a preset distance to interfere with a rotation of the one or more transfer gear parts.

7. The brake apparatus of claim 6, wherein the fixed part is disposed within the housing and spaced apart from an outer circumferential surface of the one or more transfer gear parts.

8. The brake apparatus of claim 6, wherein the rotating part comprises:
a rotating member coupled to the constraint member; and
a support part extending from the rotating member and configured to support the rotating member while abutting at least one of the fixed part and the housing.

9. The brake apparatus of claim 8, wherein the support part is disposed at an end of the rotating member and has a diameter greater than that of the rotating member.

10. The brake apparatus of claim 6, wherein the constraint member comprises:
a moving part slidably coupled to the fixed part and configured to move toward the one or more transfer gear parts when the rotating part rotates;
an entry induction part facing the one or more transfer gear parts and having a width that decreases toward an end thereof; and
a locking part provided between the entry induction part and the moving part, and locked and coupled to the one or more transfer gear parts so as to constrain the rotation of the one or more transfer gear parts.

11. The brake apparatus of claim 10, wherein the moving part comprises a screw thread positioned on an inner circumferential surface of the moving part and is screw-coupled to the rotating part.

* * * * *